United States Patent [19]
Roberts et al.

[11] Patent Number: 4,706,077
[45] Date of Patent: Nov. 10, 1987

[54] HALFTONING IMPLEMENTATION FOR INTERACTIVE IMAGE EDITING

[75] Inventors: Allen M. Roberts, Manhattan Beach; Andrew Sangster, Redondo Beach; Zoltan Stroll, Rancho Palos Verdes, all of Calif.

[73] Assignee: Xerox Corporation, Stamford, Conn.

[21] Appl. No.: 300,349

[22] Filed: Sep. 8, 1981

[51] Int. Cl.[4] ............ G09G 1/00; G09G 3/00
[52] U.S. Cl. ............... 340/728; 340/793; 358/138; 358/283
[58] Field of Search ......... 358/283, 280, 284, 138, 358/133; 340/728, 793

[56] References Cited

U.S. PATENT DOCUMENTS

| | | | |
|---|---|---|---|
| 3,953,668 | 4/1976 | Judice | 358/133 |
| 4,032,978 | 6/1977 | Wong | 358/283 |
| 4,193,096 | 3/1980 | Stoffel | 358/138 |
| 4,214,277 | 7/1980 | Urich | 358/283 |
| 4,258,393 | 3/1981 | Ejiri et al. | 358/283 |

OTHER PUBLICATIONS

IEEE Transactions on Communications, vol. COM-25, No. 11, Nov. 1977, pp. 1433-1440, New York, U.S.; C. N. Judice: "Digital Video: A Buffer-Controlled Dither Processor for Animated Images" *Sections, 2, 6; FIG. 1*.

Proceedings of the S.I.D., vol. 17, No. 2, 2nd quarter 1976, pp. 115-121; B. Lippel: "Two-and Three-Dimensional Ordered Dither in Bi-Level Picture Displays" *Sections III, V*.

*Primary Examiner*—Marshall M. Curtis
*Attorney, Agent, or Firm*—Robert E. Cunha

[57] ABSTRACT

A circuit for producing a "knight ordered dither" halftone pattern for a CRT and a "double spiral" halftone pattern for a xerographic printer is described. The circuit comprises a RAM for storing the threshold values, a comparator, and supporting addressing and logic parts. Also described are a program for allowing the operator to interactively generate threshold patterns, and several knight tour patterns specifically designed for a CRT using interlaced rasters.

10 Claims, 13 Drawing Figures

| 6 | 9 | 4 |
|---|---|---|
| 3 | 1 | 7 |
| 8 | 5 | 2 |

COLUMN

|ROW|0|1|2|3|4|5|6|7|
|---|---|---|---|---|---|---|---|---|
|0|12|10|8|30|32|34|36|38|
|1|14|0|6|28|54|56|58|40|
|2|16|2|4|26|52|62|60|42|
|3|18|20|22|24|50|48|46|44|
|4|32|34|36|38|12|10|8|30|
|5|54|56|58|40|14|0|6|28|
|6|52|62|60|42|16|2|4|26|
|7|50|48|46|44|18|20|22|24|

| 1 | 3 |
|---|---|
| 4 | 2 |

PRIOR ART

COLUMN

|ROW|0|1|2|3|
|---|---|---|---|---|
|0|1|9|3|11|
|1|13|5|15|7|
|2|4|12|2|10|
|3|16|8|14|6|

| 6 | 9 | 4 |
|---|---|---|
| 3 | 1 | 7 |
| 8 | 5 | 2 |

FIG. 5

COLUMN

|  | | 0 | 1 | 2 | 3 | 4 | 5 |
|---|---|---|---|---|---|---|---|
| ROW | 0 | 21 | 33 | 13 | 23 | 35 | 15 |
| | 1 | 9 | 1 | 25 | 11 | 3 | 27 |
| | 2 | 29 | 17 | 5 | 31 | 19 | 7 |
| | 3 | 24 | 36 | 16 | 22 | 34 | 14 |
| | 4 | 12 | 4 | 28 | 10 | 2 | 26 |
| | 5 | 32 | 20 | 8 | 30 | 18 | 6 |

FIG. 6

|  |  |  |  |  |  |  |  | EVEN SCAN | ODD SCAN |
|---|---|---|---|---|---|---|---|---|---|
|  |  |  |  |  |  |  |  | 0 |  |
| 24 | 6 |  | 27 | 9 |  | 22 | 4 |  | 6 |
|  |  | 15 |  |  | 18 |  | 13 | 3 |  |
|  |  |  |  |  | 28 |  |  |  | 1 |
| 21 | 3 |  | 19 | 1 |  | 25 | 7 | 6 |  |
|  |  | 12 |  |  | 10 |  | 16 |  | 3 |
|  |  |  |  |  |  |  | 29 | 1 |  |
| 26 | 8 |  | 23 | 5 |  | 20 | 2 |  | 6 |
|  |  | 17 |  |  | 14 |  | 11 | 3 | 3 |
|  |  |  |  |  |  |  |  | 13 | 16 |

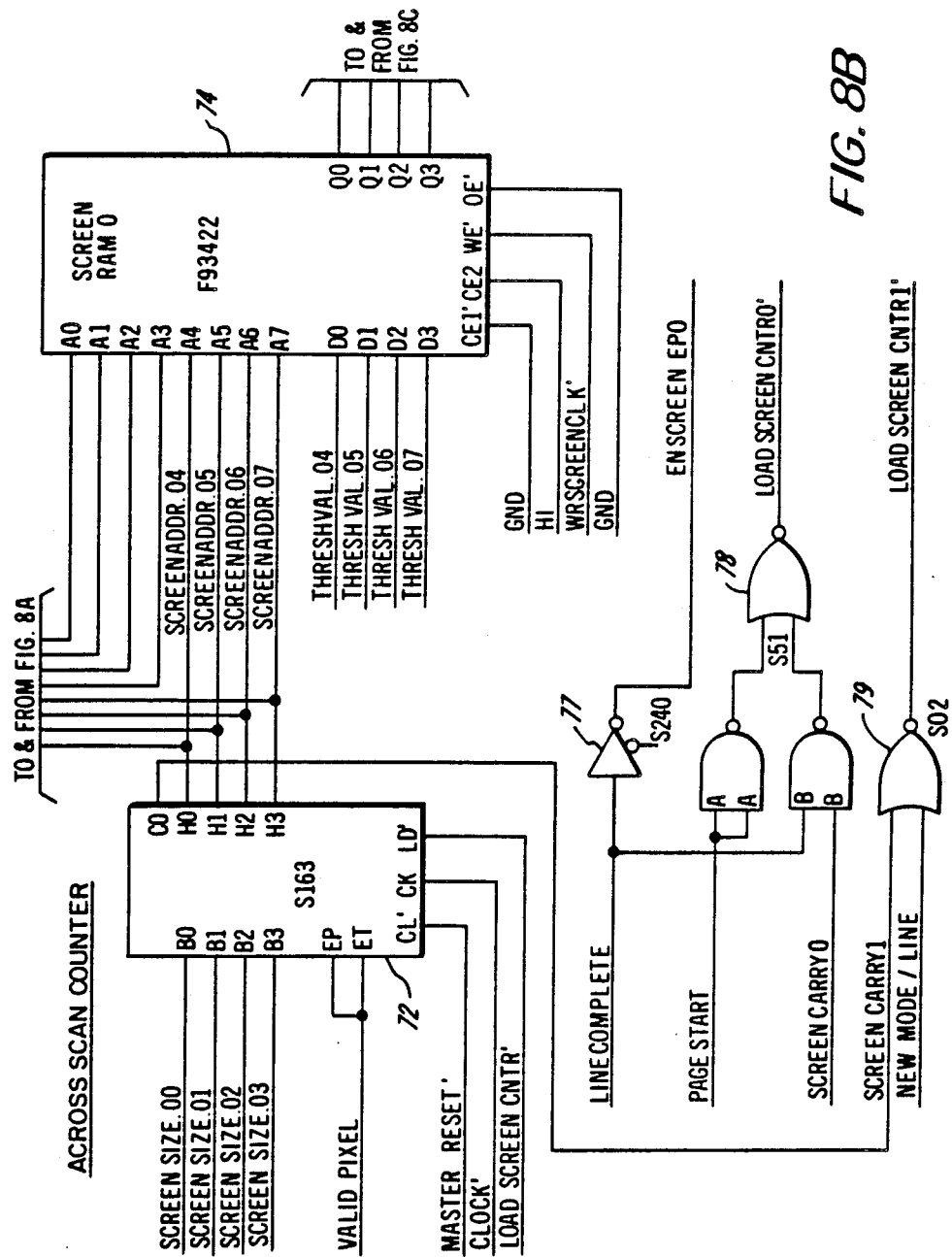

```
maxGrayValue, start, end, divisor, i : CARDINAL;
screenLongPointer: LONG POINTER TO screenRecord;
byte: TYPE = CHARACTER;                --8 bits
screenRecord: TYPE = RECORD
    [filler: PACKED ARRAY [0..160) OF byte,           --unused
     scanlines: ARRAY[0..6) OF RECORD
        [filler2: PACKED ARRAY [0..10) OF byte,       --also unused
         data: PACKED ARRAY [0..6) OF byte]];

rowTable: ARRAY [0..35] OF CARDINAL =
[1,4,1,4,2,5,1,4,1,4,0,3,0,3,2,5,2,5,0,3,0,3,1,4,1,4,2,5,2,5,0,3,0,3];

columnTable: ARRAY [0..35] OF CARDINAL=
[1,4,4,1,2,5,5,2,0,3,3,0,2,5,5,2,1,4,4,1,0,3,3,0,2,5,5,2,0,3,3,0,1,4,4,1];

*****COMPUTE SCREEN VALUES******
maxGrayValue ← 64;
IF picptr.density = 0
THEN
    BEGIN
        screenLongPointer.scanlines[5].data[5] ← 20C;
    END
ELSE
    BEGIN
    IF picptr.density <= 36
    THEN
        BEGIN
            screenLongPointer↑ ← [filler: ALL [0C], scanlines: ALL[[filler2:ALL[0C], data: ALL[77C]]];
```

*FIG. 10A*

```
start ← 0;
end ← picptr.density - 1;
divisor ← picptr.density;
FOR i IN [start..end]
    DO
    screenLongPointer.scanlines[rowTable[i]].data[columnTable[i]] ←
        ((i * maxGrayValue) / divisor) + 0C;
    ENDLOOP;
    END
ELSE
    BEGIN
    screenLongPointer↑ ← [filler: ALL[0C], scanlines: ALL[[filler2: ALL[0C], data: ALL[0C]]]];
    start ← picptr.density - 36;
    end ← 35;
    divisor ← (end - start) + 1;
    FOR i IN [start..end]
        DO
        screenLongPointer.scanlines[rowTable[i]].data[columnTable[i]] ←
            (((i - start) * maxGrayValue) / divisor) + 0C;
        ENDLOOP;
    END;
END;
```

\* \* \* \* \* \* \* END SCREEN VALUE COMPUTATION \* \* \* \* \* \* \* \* \* \* \* \*

FIG. 10B

HALFTONING IMPLEMENTATION FOR INTERACTIVE IMAGE EDITING

The described invention is a circuit which will produce from a single scanned-in gray scale image several kinds of halftone outputs, including a low resolution flicker-free halftone output for a CRT display and a high resolution halftone output suitable for office quality hard copy. An improved halftone pattern for CRT use is also described.

In printing systems which edit images and text, one common procedure is to scan in data, to edit the material through the use of a CRT display and to print the edited result. The input data can be character coded text read from magnetic media, and continuous tone or halftone images scanned in through a raster input scanner (RIS). The RIS output is assumed to be gray scale data of, for example, eight bits per pixel.

There are different halftone patterns for CRT displays and hard copy printing. In a halftone pattern for a CRT, the white and black picture elements are relatively uniformly distributed over the area and the resolution is low, 80 picture elements per inch for example. For hard copy, the pixels are grouped into white and black dots of varying sizes and the resolution is high, 480 picture elements per inch for example.

For the production of these different halftones, two programs, or for higher speed, two circuits are required. An improvement would be to design a single circuit that can produce both patterns efficiently from the same scanned-in image data base.

An additional problem with a CRT halftone pattern is that it may cause objectionable flicker in a CRT with an interlaced raster. To be specific, in the system described herein, a full CRT display is produced at the approximate rate of 15 displays per second, and at this rate a noticeable flicker would be obvious to the viewer. To correct this, odd rasters are used to create one display and even rasters are used to create the next. The result is an apparent rate of 30 displays per second which does not flicker.

The above would be useable for text and line graphics in white and black, but for halftone images a flicker may still be created if the bits selected to represent gray tones are predominantly located on off (or even) rasters. In this case, some portions of halftone images will flicker. The solution is to use a halftone pattern which guarantees that for all levels of gray, the number of black pixels on odd and even lines are approximately equal.

The circuit and halftone patterns used to accomplish these objectives are described in relation to the following figures.

FIG. 1 is a double spiral halftone pattern suitable for xerographic printing.

FIG. 2 is a prior art dither ordered halftone pattern.

FIG. 3 is a prior art two level ordered dither halftone pattern.

FIG. 4 is a knight tour halftone pattern.

FIG. 5 is a knight ordered dither halftone pattern.

FIG. 6 is a knight/knight dither halftone pattern.

FIGS. 8A–8C are a schematic diagram of the circuit for producing these patterns.

FIGS. 10A–10B are a program for producing threshold levels for producing the family of curves shown in FIG. 9.

Figure 7:
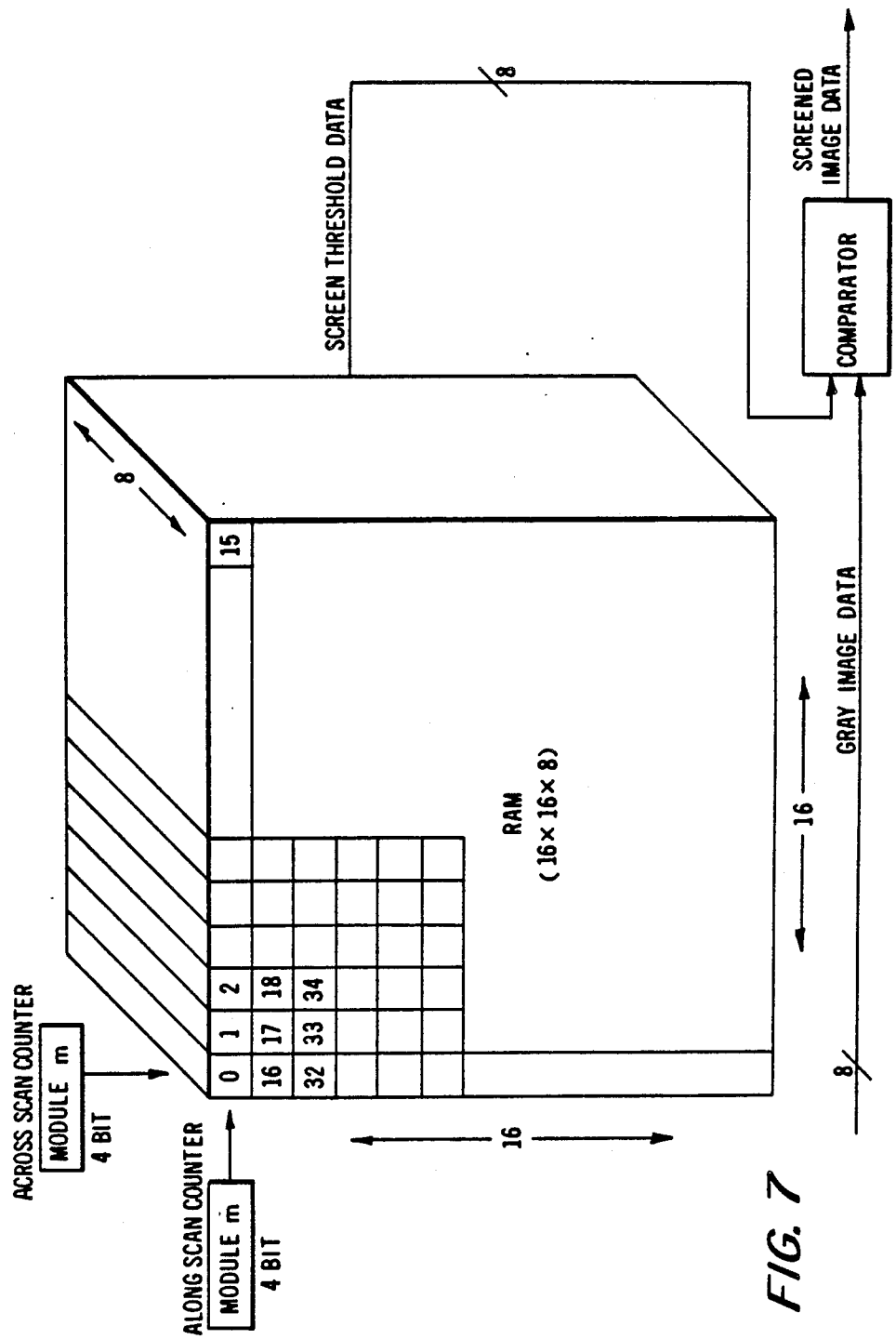
FIG. 7 is a conceptual diagram of the circuit for producing these patterns.

After the text and image data is scanned or otherwise loaded into the system, the next step in the editing process is to bring the images and text for a first page up on the display, to vary the image size, location, density, contrast, etc., and to position any text that will appear on the page. When the page is in final form, it can be printed, stored, transmitted, etc.

In order to display the image data on the screen and to print it, halftone patterns are required. The pattern used for printing in this system, shown in FIG. 1, is a double spiral 8×8 matrix with gray levels varying from 0 to 62. As is well known, as the original image data progresses from white to black, the size of the white portions become smaller and the size of the black portions become larger. While this pattern produces good results with a xerographic printer, a system which more uniformly spreads the pixels over the area is better suited for a CRT display.

A prior art "dither" pattern for use in a flat panel is shown in FIG. 2. This type of pattern spreads the pixels over the area but doesn't have enough levels.

Four of these dither patterns can be combined into the "two level ordered dither" pattern of FIG. 3 to provide sixteen levels. However, it cannot be used in a system using interlaced rasters on a CRT because of the flicker that will be generated at certain density levels. For example, assume a density level of 4. Then pixels 1, 2, 3 and 4 will be black, the rest white. On every display of even rasters there will be four black pixels (rows 0 and 2, pixels 1, 2, 3 and 4) but on every odd raster (rows 1 and 3) all pixels will be white. A visible flicker results.

The "knight tour" halftone pattern shown in FIG. 4 has the even distribution characteristic of the pattern of FIG. 3 but will produce a minimum of flicker on an interlaced raster CRT display. However, it has only nine levels.

The "knight ordered dither" pattern of FIG. 5 combines four knight ordered patterns into a single 6×6 matrix containing 36 levels. Since there are three rows separating the corresponding pixels of each 3×3 quadrant, the difference in the number of black pixels per matrix between odd and even scans is never more than one.

For a greater number of levels, the knight/knight dither pattern of FIG. 6 can be used. This is a 9×9 matrix comprising nine 3×3 knight tour segments, the nine segments themselves being a knight tour (rather than ordered dither as in FIG. 5). In FIG. 6, the first twenty-nine levels are shown to indicate the pattern. The imbalance in this case will be minimal (13 to 16) and the dispersion over the area is sufficient to create an apparently flicker-free display.

A knight ordered pattern thus has three useful characteristics. It evely distributes the black pixels over the matrix, it sufficiently balances the pixels between even and odd scans, and, as will be explained below, it can be produced by the same circuit that produces the hard copy pattern of FIG. 1.

Figure 8A:
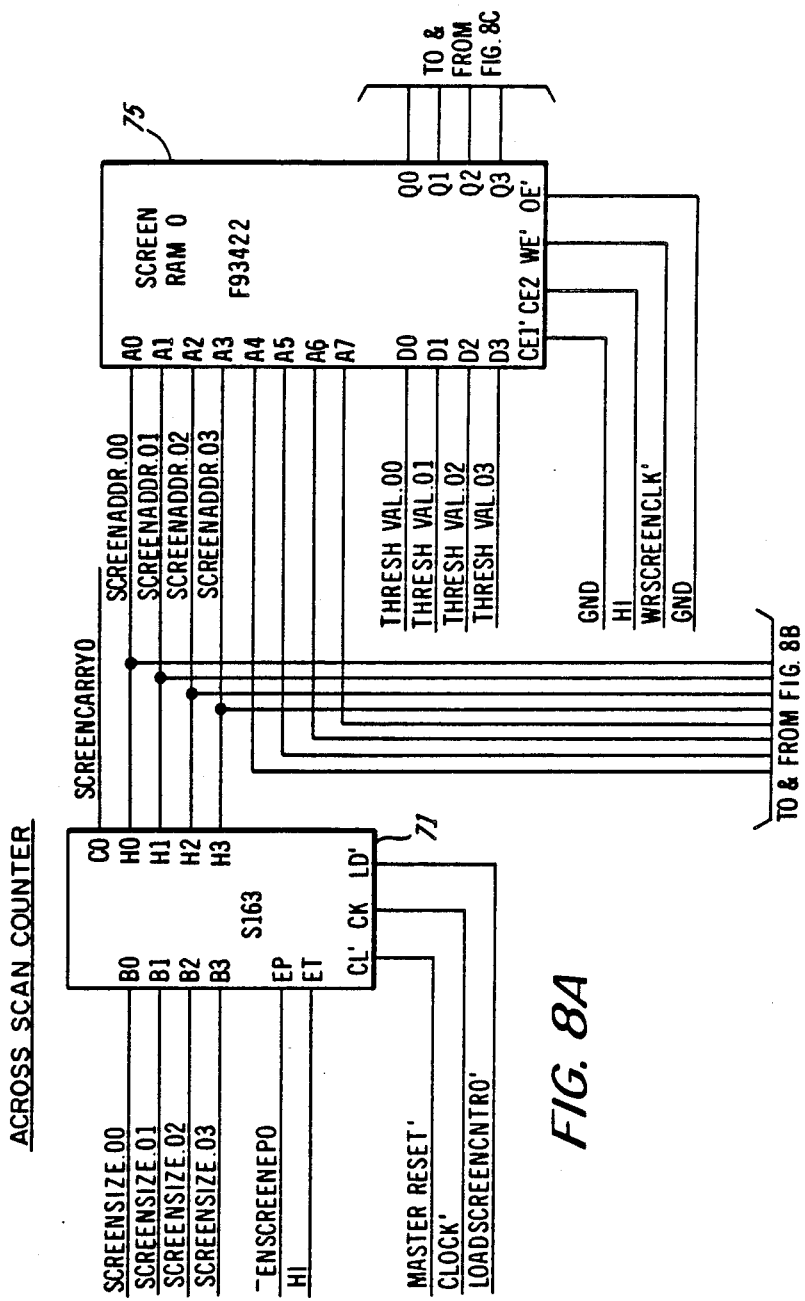
Figure 8C:
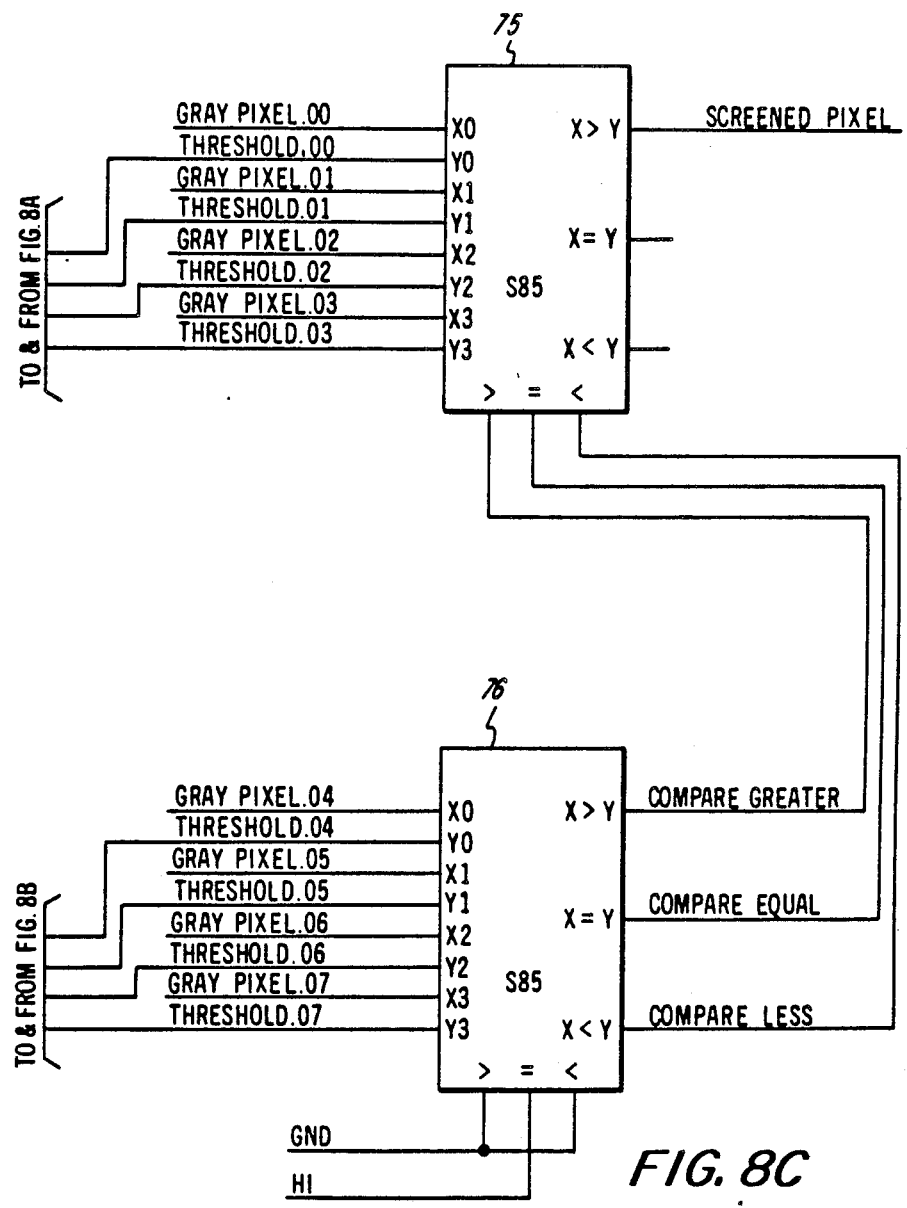

The circuit for producing both of these halftone patterns is shown in schematic form in FIG. 8 and in conceptual form in FIG. 7.

Referring to FIG. 7, a random access memory with a maximum capacity of 16×16 words, each 8 bits long, is loaded with the threshold values for either the entire FIG. 5 or FIG. 1 matrix. For this discussion, assume the 6×6 matrix of FIG. 5. Then the first six rows of the first six columns of the memory will be loaded. That is, locations 0,1,2,3,4,5,16,17,18,19,20,21,32,33, etc. Also, both scan counters will be set to modulo 6. Finally, in the hardware, the "Along Scan Counter" is incremented after every pixel, the "Across Scan Counter" is incremented at the end of each raster, and each output "screen threshold data" word is compared against the corresponding "gray image data" word at the comparator.

In this case, location 0 in FIG. 7 would have the value for the row 0, column 0 element of FIG. 5, which shows a threshold level of 21. Then, as the series of pixels in the raster is compared, a series of halftoned binary bits will be output from the comparator as the "screend image data".

To change operation from producing the 6×6 knight ordered dither pattern to the 8×8 double spiral pattern of FIG. 1, the first eight rows of the first eight columns are loaded with the thresholds appropriate to the new pattern, and the counters are changed to modulo 8.

It should now be clear that this circuit can be used to generate any number of halftone patterns of any size up to 16×16 pixels by loading the appropriate threshold values in the RAM and resetting the counters to the appropriate values. In fact, a 1×1 matrix is also used. This is the threshold for text and line graphics which can be black or white. In use, the threshold level is loaded in the first location and all pixels are compared to it.

The actual schematic diagram of this circuit is shown in FIG. 8. The Across Scan Counter 71 is loaded through lines Screen Size 00-03 with a negative value when write enabled by line Load Screen Cntr0. Counter 71 then proceeds to count up to zero, generating a Screen Carry 0 (overflow) signal when it reaches zero. During the counting process, the four output lines Screen Addr 00-03 are used to address RAM 73. Counter 72 operates identically to produce the other four address bits, so that the entire 256 word RAM can be addressed. In operation, the Along Scan Counter is incremented for each pixel (clock) and reloaded at the end of each matrix, while the Across Scan Counter is incremented at the end of each line and reloaded at the end of each matrix.

The threshold values, ThreshVal 00-07 are load enabled by line Wr Screen Clk, and the eight outputs Threshold 00-07 are coupled to the comparator 75, 76 along with the gray image data Gray Pixel 00-07. The output line of the comparator is labeled Screened Pixel.

Gate 77 allows the Across Scan Counter 71 to increment at the end of each line. Gate 78 restarts the Across Scan Counter 71 at row 0 of the matrix if a line is completed and if the last matrix row is completed (which is when Counter 71 overflows and generates a carry out, Screen Carry 0) and at the start of each page. Gate 79 restarts the Along Scan Counter 72 at column 0 if the Counter 72 overflowed or if there is a screen size or line change.

So far in this discussion, it has been assumed that threshold levels would be evenly distributed over the range of inputs. For example, FIG. 5 assumes an even density distribution of threshold levels from 1 to 36. This is shown in graphical form in FIG. 9, curve number 1. Threshold number 1 in FIG. 5 will be assigned a gray scale value of 1 as shown in curve 1 of FIG. 9, threshold number 2 will be assigned a value of 2, etc. Thus, gray scale values will be compared against an evenly distributed set of threshold values in the comparator and the output density and contrast of the copy will equal those of the original.

A further improvement, which can be incorporated into the system, is to make the various threshold levels adjustable by the operator through the use of interactive software. The need for this capability arises when the operator sees that the scanned image does not have enough contrast, density, etc. This software then gives the operator the capability of adjusting these parameters before printing. Ideally, the CRT and printer are both varied identically to allow the operator to see the adjusted image prior to printing.

Figure 9:
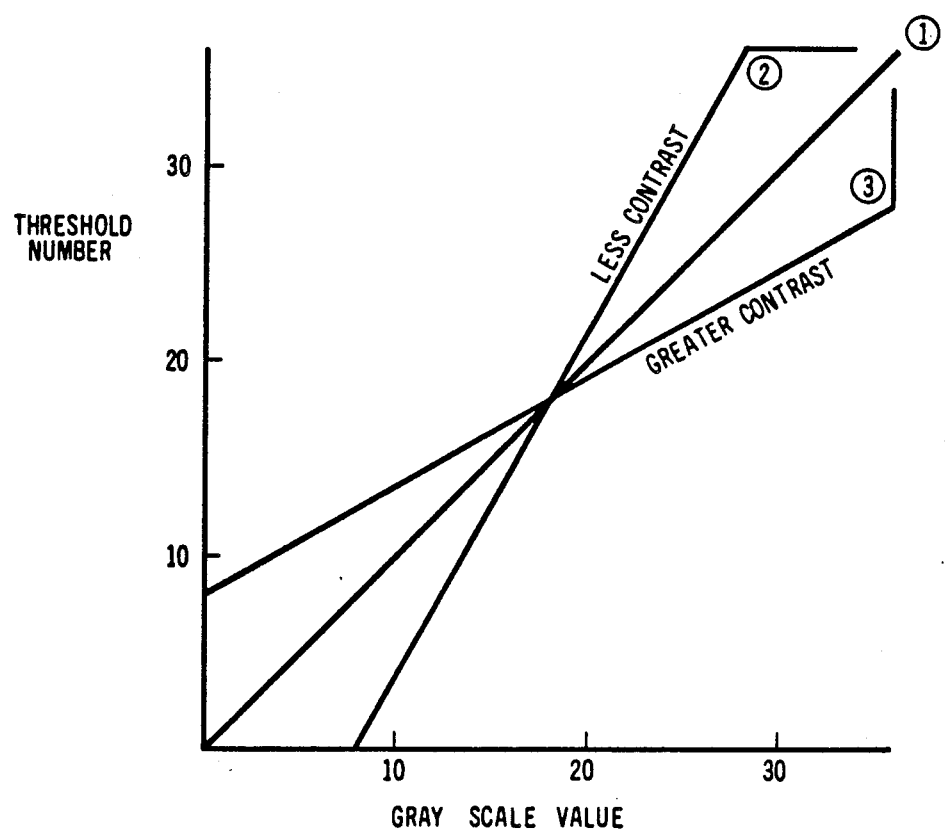
FIG. 9 is a family of tonal rendition curves showing a variation of contrast and density.

For example, as shown in FIG. 9, curve 3, to increase the contrast, all threshold numbers of 8 and below will be assigned a gray scale value of zero, and all threshold numbers of twenty-eight and above will be assigned a value of thirty-six. This will result in a greater than normal probability of all-black and all-white areas on the copy, and increase the contrast of the copy over that of the original. Similarly, the average density can be varied by shifting curve 1 to the right or left. In fact, any shape of curve can be created with the appropriate software.

As an example of this software, the program of FIG. 10 generates a family of curves similar to that shown in FIG. 9 for the knight ordered dither pattern of FIG. 5. This program is written in Mesa which is a variant of Pascal, and is provided in the software to allow the operator to control the tonal rendition curve on an interactive basis.

The program of FIG. 10 allows the operator to change both the bias and the shape of FIG. 9 curve with a single parameter: picptr.density. After declaring some local variables, the program also declares the halftone cell, screenRecord, to be a two dimensional array with appropriate fillers. Next, row Table and column Table are declared. The value of each pair of row/column elements in the table is the coordinates of a picture element in the halftone cell, and the ordering of the coordinates in row Table and column Table is the order in which increasing values should be placed into the cell to create the 6×6 Knight Ordered Dither pattern of FIG. 5.

To compute screen values, the program first checks for the value zero in picptr.density. (Picptr.density, although not shown in FIG. 10, is an integer parameter in the range of 0 to 71.) This is a special case, and indicates that the image data is to be treated as line art and should be uniformly thresholded rather than halftoned. If picptr.density is zero, the screenRecord will be loaded with a single value, 20. Otherwise, picptr.density contains some positive non-zero value, and a Knight Ordered Dither cell will be constructed. If the value is equal to or less than 36, the increment between successive threshold values is effectively maxGrayValue divided by picptr.density. The first FOR loop places the successive values into the halftone cell using column Table and row Table to place the thresholds in their correct Knight Ordered Dither position. The process starts with the value zero, and effectively terminates the generation of thresholds such that the highest value is limited to maxGrayValue minus one. Since the entire screen array was preset to all ones prior to entering the FOR loop, all picture elements not adressed by the FOR loop will remain set to their maximum value.

The generation of screen values when picptr.density is greater than 36 is handled in a fashion symmetrical to the way values were determined when picptr.density was less than or equal to 36. The increment between successive threshold values is effectively maxGrayValue divided by the difference between maxGrayValue and picptr.density. The second FOR loop places values into screenRecord using columnTable and rowTable as before, and the presetting of the screenRecord to all zeros prior to entering the FOR loop ensures that any low numbered picture elements in the screen that were not addressed by the FOR loop will be zero.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

We claim:

1. The method of assigning threshold values to each element of a 3 by 3 element halftone matrix comprising the steps of:
   determining a set of nine numerically ascending or descending threshold values,
   numbering the elements of said matrix, row by row, as follows: 6,9,4,3,1,7,8,5,2, and
   assigning said set of threshold values to said matrix in numerical order.

2. The method of assigning threshold values to each element of a 6 by 6 element halftone matrix comprising the steps of:
   determining a set of 36 numerically ascending or descending threshold values,
   numbering the elements of said matrix, row by row, as follows: 21,33,13,23,35,15,9,1,25,11,3,27,29,17,5,31,19,7,24,-36, 16,22,34,14,12,4,28,10,2,26,32,20,8,30,18,6 and
   assigning said set of threshold values to said matrix in numerical order.

3. The method of assigning threshold values to each element of a three by three element halftone matrix comprising the steps of:
   determining a set of nine numerically ascending or descending threshold values, and
   assigning these values to said matrix in a knight tour pattern.

4. The method of assigning threshold values to each element of a six by six element halftone matrix comprising the steps of:
   determining a set of thirty-six numerically ascending or descending threshold values, and
   assigning these values to said matrix in a knight ordered dither pattern.

5. The method of assigning threshold values to each element of a nine by nine element halftone matrix comprising the steps of:
   determining a set of eighty-one numerically ascending or descending threshold values, and
   assigning these values to said matrix in a two level nested knight tour pattern.

6. A three by three element halftone matrix comprising:
   a set of nine numerically ascending or descending threshold values, the elements of said matrix numbered, row by row, as follows: 6, 9,4,3,1,7,8,5,2, said set of threshold values assigned to said matrix in numerical order.

7. A six by six element halftone matrix comprising a set of 36 numerically ascending or descending values, the elements of said matrix numbered, row by row, as follows: 21,33,13,23,35,15,9,1,25, 11,3,27,29,17,5,31,19,7,24,36,16,22,34,14,12,4,28,10,2,26, 32,20,8,30,18, and 6, said set of threshold values assigned to said matrix in numerical order.

8. A three by three element halftone matrix comprising numerically ascending or descending threshold values assigned to said matrix in a knight tour pattern.

9. A six by six element halftone matrix comprising a set of thirty-six numerically ascending or descending threshold values assigned to said matrix in a knight ordered dither pattern.

10. A nine by nine element halftone matrix comprising a set of eighty-one numerically ascending or descending threshold values, assigned to said matrix in a two level nested knight tour pattern.

* * * * *